United States Patent [19]

Shizawa et al.

[11] Patent Number: 4,743,641
[45] Date of Patent: May 10, 1988

[54] POLYCARBONATE RESIN COMPOSITION

[75] Inventors: Tatsuji Shizawa, Ichihara; Naoki Nonagase, Nishinomiya; Kenji Ozawa, Ichihara, all of Japan

[73] Assignee: Idemitsu Petrochemical Co., Ltd., Tokyo, Japan

[21] Appl. No.: 2,171

[22] Filed: Jan. 12, 1987

[30] Foreign Application Priority Data

Feb. 6, 1986 [JP] Japan .................. 61-22956

[51] Int. Cl.$^4$ .................. C08L 69/00; C08K 5/10
[52] U.S. Cl. .................. 524/317; 524/318; 524/611
[58] Field of Search ........... 524/318, 315, 611, 317, 524/537; 528/495

[56] References Cited

U.S. PATENT DOCUMENTS 4,306,057 12/1981 Barker et al. .................. 528/491

FOREIGN PATENT DOCUMENTS 0041092 10/1972 Japan .

Primary Examiner—Theodore E. Pertilla
Attorney, Agent, or Firm—Frishauf, Holtz, Goodman & Woodward

[57] ABSTRACT

A polycarbonate resin composition comprising (A) a polycarbonate resin containing from 10 to 6,000 ppm of phenolic residues, (B) a partial ester of an aliphatic saturated monovalent carboxylic acid and a polyhydric alcohol in amount of from 0.001 to 0.5 part by weight per 100 parts by weight of the component (A) and (C) a mixture of one or more of an aliphatic higher monohydric alcohols in amount of from 0.003 to 1.0 part by weight per 100 parts by weight of the component (A).

By the use of this composition, a molding having an excellent appearance can be produced.

15 Claims, No Drawings

POLYCARBONATE RESIN COMPOSITION

BACKGROUND OF THE INVENTION

The present invention relates to a polycarbonate resin composition and more particularly to a polycarbonate resin composition which is freed of phenolic residues and thus it is capable of providing a molding having an excellent appearance.

In recent years, a reduction in the weight of material has been extensively made for cars, home electric appliances and so forth from a viewpoint of energy saving. With this trend, replacement of glass with plastics has been accelerated. As such replacements, polycarbonate resin moldings are considered hopeful because of their excellent transparency, mechanical characteristics and dimensional stability.

A polycarbonate resin is molded by techniques such as injection molding, blow molding, compression molding and rotational molding. If, however, unreacted starting materials (e.g., bisphenol A) and phenolic residues as derived from carbonate oligomers remain unremoved in the polycarbonate resin, they attaches to a mold, deteriorating the appearance of moldings. Removal of such attaches needs cleaning of the mold and during this cleaning process, the molding should be stopped, which is undesirable from an economic standpoint.

Another means to overcome the above problem is to remove the phenolic residues from the polycarbonate resin. For this purpose, it suffices that the polycarbonate resin is washed more thoroughly. In this case, however, a much longer time is needed for the removal operation and productivity is seriously reduced, which is disadvantageous from an industrial standpoint. Under such circumstances, various attempts to remove the residues by compounding suitable additives to the resin have been made. For example, Japanese patent publication No. 44552/1976, Japanese patent application Laid-Open Nos. 84352/1980 and 81245/1985 disclose that aliphatic carboxylic acid esters, aliphatic alcohols and the like are compounded to the polycarbonate resin to remove halogen or to improve releasability at the time of molding or to increase heat resistance. If, however, the above known compounds are used alone, the effect of removing phenolic residues is small.

SUMMARY OF THE INVENTION

An object of the present invention is to provide a method whereby phenolic residues can be efficiently removed in a simplified manner without enhancing the washing of a polycarbonate resin.

Another object of the present invention is to provide a method of removing phenolic residues from a polycarbonate resin by adding an additive.

It has been found that the amount of phenolic residues in a polycarbonate resin can be greatly decreased by adding a specified amount of a partial ester of an aliphatic saturated monovalent carboxylic acid and a polyhydric alcohol and a specified amount of an aliphatic higher monohydric alcohol.

The present invention relates to a polycarbonate resin composition comprising (A) a polycarbonate resin containing from 10 to 6,000 ppm (parts per million) of phenolic residues (B) a partial ester of an aliphatic saturated monovalent carboxylic acid and a polyhydric alcohol with an amount of from 0.001 to 0.5 part by weight per 100 parts by weight of (A) the polycarbonate resin and (C) a mixture of one or more of aliphatic higher monohydric alcohols with an amount of from 0.003 to 1.0 part by weight per 100 parts by weight of (A) the polycarbonate resin.

DETAILED DESCRIPTION OF THE INVENTION

The polycarbonate resin as the base component of the present composition can be prepared by the solvent method, i.e., a reaction of a divalent phenol and a carbonate precursor such as phosgen or an ester exchange reaction of a divalent phenol and a carbonate precursor such as diphenyl carbonate, in a solvent such as methylene chloride, etc. in the presence of a known acid acceptor and a known molecular weight regulator.

Divalent phenols which can be preferably used in the present invention are bisphenols. Particularly preferred is 2,2-bis(4-hydroxyphenyl)propane (bisphenol A). In addition, a mixture resulting from partial or whole replacement of bisphenol A with other divalent phenols can be used. Examples of divalent phenols other than bisphenol A which can be used are compounds such as hydroquinone, 4,4'-dihydroxydiphenyl, bis(4-hydroxyphenyl)alkane, bis(4-hydroxyphenyl)cycloalkane, bis(4-hydroxyphenyl)sulfide, bis(4-hydroxyphenyl)sulfone, bis(4-hydroxyphenyl)sulfoxide and bis(4-hydroxyphenyl)ether, and halogenated bisphenols such as (3,5-dibromo-4-hydroxyphenyl)propane and bis(3,5-dichloro-4-hydroxyphenyl)propane. In addition, homopolymers of the above divalent phenols and copolymers of two or more of the above divalent phenols, or blends of the above divalent phenols can be used.

The polycarbonate resin that is used in the present invention may be a thermoplastic random branched polycarbonate as derived from a polyfunctional aromatic compound and a divalent phenol and a carbonate precursor.

The viscosity average molecular weight of the polycarbonate resin as used herein is preferably from 10,000 to 100,000 and particularly preferably from 14,000 to 35,000.

The effect of the present invention, i.e., removal of phenolic residues, is fully exhibited when as the component (A) of the present composition, a polycarbonate resin containing from 10 to 6,000 ppm, especially from 10 to 1,000 ppm of phenolic residues is used. If the phenolic residue content of the polycarbonate resin is in excess of 6,000 ppm, the above effect is not exhibited. On the other hand, if the phenolic residue content is less than 10 ppm, the necessity of removing phenolic residue is small.

As the component (B) of the present composition, a partial ester of an aliphatic saturated monovalent carboxylic acid and a polyhydric alcohol is used. This aliphatic saturated monovalent carboxylic acid contains preferably from 10 to 24 carbon atoms and particularly preferably from 12 to 20 carbon atoms. Representative examples of such aliphatic saturated monovalent carboxylic acids are capric acid, lauric acid, myristic acid, palmitic acid stearic acid, arachidic acid and behenic acid.

Examples of polyhydric alcohols are dihydric alcohols such as ethylene glycol, propylene glycol, ethylethylene glycol, trimethylene glycol and tetramethylene glycol; trihydric alcohols such as propanetriol, methylpropanetriol, butanetriol, pensanetriol and hexanetriol; tetrahydric alcohols such as erythritol, pentaerythritol, diglycerine and sorbitan; pentahydric alcohols such as adonitol and arabitol; and hexahydric alcohols such as allitol, talitol, sorbitol and mannitol. Among these polyhydric alcohols, trihydric and tetrahydric alcohols are preferable.

Preferred examples of the partial ester as used herein are stearic acid monoglyceride, stearic acid diglycerine monoester, palmitic acid monoglyceride and sorbitan monostearate.

The amount of the component (B) compounded should be from 0.001 to 0.5 part by weight per 100 parts by weight of (A) the polycarbonate resin. Preferably the amount of the component (B) compounded is from 0.01 to 0.2 part by weight per 100 parts by weight of (A) the polycarbonate resin.

As the component (C) of the present composition, a mixture of one or more of aliphatic higher monohydric alcohols is used. The aliphatic higher monohydric alcohol as used herein is not critical. Aliphatic higher monohydric alcohols having from 12 to 30 carbon atoms are preferred, with those alcohols having from 14 to 22 carbon atoms being particularly preferred. Representative examples of such aliphatic higher monohydric alcohols are myristyl alcohol, cetyl alcohol, stearyl alcohol, arachidic alcohol and behenyl alcohol. These higher alcohols can be used alone or in combination with each other. The amount of the component (C) compounded should be from 0.003 to 1.0 part by weight per 100 parts by weight of (A) the polycarbonate resin. Preferably the mount of the component (C) compounded is from 0.03 to 0.5 part by weight per 100 parts by weight of (A) the polycarbonate resin. Even though the amount of the component (B) compounded is within the above specified range, if the amount of the component (C) compounded is less than 0.003 part by weight, the phenolic residue removing effect is decreased, and if it in excess of 1.0 part by weight, cracks are developed in the molding surface, deteriorating the product value and furthermore the impact strength is decreased. On the other hand, even though the amount of the component (C) compounded is within the above specified range, if the amount of the component (B) compounded is less than 0.001 part by weight, the phenolic residue removing effect is small, and if the amount of the component (B) compounded is in excess of 0.5 part by weight, not only the phenolic residue removing effect cannot be obtained but rather a problem of coloration of the resin undesirably occurs.

Various additives can be added to the polycarbonate resin composition of the present invention unless they inhibit the objects of the present invention. For example, antioxidant such as phosphorous ester type and phosphoric ester type, a commonly used heat stabilizer, a releasing agent, a flame retardant, a pigment and the like can be added if necessary. In addition, various inorganic fillers and glass fibers can be compounded as reinforcing agents.

The polycarbonate resin composition of the present invention can be prepared by mixing and kneading the above components. This mixing and kneading can be carried out by commonly used techniques such as by the use of a ribbon blender, a Henschel mixer, a Banbury's mixer, a drum tumbler, a monoaxial screw extruder, a twin-axial screw extruder, a cokneader and a multi-axial screw extruder. The temperature in kneading is usually from 250° to 300° C.

The polycarbonate resin composition thus prepared can provide a molding having an excellent appearance because it is sufficiently freed of phenolic residues.

Accordingly the polycarbonate resin composition of the present invention can be advantageously used in production of moldings for cars such as a car bumper, home electric appliances and so forth, by techniques such as injection molding, extrusion molding, compression molding, calender molding and rotational molding.

The present invention is described in greater detail with reference to the following examples.

EXAMPLES 1 TO 14, AND COMPARATIVE EXAMPLES 1 TO 6

A polycarbonate resin (Component (A))) was prepared by reacting bisphenol A and phosgen in methylene chloride by the usual method refer to, for example U.S. Pat. No. 3,974,126). The viscosity average molecular weight of the polycarbonate resin was 22,000 and its phenolic residue content was 170 ppm.

Predetermined amounts of components (B) and (C) shown in Table 1 were compounded to 100 parts by weight of the component (A) and then applied to injection molding. The results are shown in Table 1.

The phenolic residue content was measured as follows:

A sample (10 g (grams)) was extracted with 120 ml of acetone for 8 hours in a Soxhlet extractor. The acetone was distilled away, and the solid thus obtained was vacuum dried. Then the solid was dissolved in methylene chloride and sodium hydroxide was added, and then stirred. The absorbance at 293 nm of the reaction product was measured and based on this absorbance value, the phenolic residue content was determined.

TABLE 1

| | Component (B) | | Component (C) | | Phenolic Residue Content after Treatment (wt ppm) | Yellowing Factor[*3] | Appearance of Inside of Mold[*4] | Surface of Molding[*5] | Izod Impact Strength (notched[*6]) (kg · cm/cm) |
|---|---|---|---|---|---|---|---|---|---|
| | Type[*1] | Amount (parts by weight) | Type[*2] | Amount (parts by weight) | | | | | |
| Example | | | | | | | | | |
| 1 | B-1 | 0.03 | C-1 | 0.03 | 70 | 1.9 | o | o | 91 |
| 2 | B-1 | 0.03 | C-1 | 0.4 | 50 | 2.0 | o | o | 88 |
| 3 | B-1 | 0.1 | C-1 | 0.1 | <10 | 1.9 | o | o | 91 |
| 4 | B-1 | 0.1 | C-1 | 0.4 | <10 | 2.4 | o | o | 90 |
| 5 | B-1 | 0.2 | C-1 | 0.03 | <10 | 2.0 | o | o | 92 |
| 6 | B-1 | 0.2 | C-1 | 0.4 | <10 | 2.4 | o | o | 89 |
| 7 | B-2 | 0.1 | C-1 | 0.1 | <10 | 2.2 | o | o | 92 |
| 8 | B-3 | 0.1 | C-1 | 0.1 | <10 | 2.0 | o | o | 91 |
| 9 | B-4 | 0.1 | C-1 | 0.1 | <10 | 2.3 | o | o | 89 |
| 10 | B-1 | 0.1 | C-2 | 0.1 | <10 | 2.0 | o | o | 92 |
| 11 | B-2 | 0.1 | C-2 | 0.1 | <10 | 2.4 | o | o | 90 |
| 12 | B-3 | 0.1 | C-2 | 0.1 | <10 | 2.2 | o | o | 89 |

TABLE 1-continued

| | Component (B) | | Component (C) | | Phenolic Residue Content after Treatment (wt ppm) | Yellowing Factor*3 | Appearance of Inside of Mold*4 | Surface of Molding*5 | Izod Impact Strength (notched*6) (kg·cm/cm) |
|---|---|---|---|---|---|---|---|---|---|
| | Type*1 | Amount (parts by weight) | Type*2 | Amount (parts by weight) | | | | | |
| 13 | B-1 | 0.1 | C-3 | 0.1 | <10 | 2.2 | o | o | 91 |
| 14 | B-1 | 0.1 | C-4 | 0.1 | <10 | 2.4 | o | o | 90 |
| Comparative Example | | | | | | | | | |
| 1 | — | 0 | — | 0 | 150 | 2.0 | x | o | 92 |
| 2 | — | 0 | C-1 | 0.3 | 130 | 2.4 | x | o | 89 |
| 3 | B-1 | 0.6 | C-1 | 0.3 | <10 | 3.7 | x | o | 70 |
| 4 | B-1 | 0.2 | C-1 | 0 | 140 | 2.6 | x | o | 90 |
| 5 | B-1 | 0.2 | C-1 | 1.2 | <10 | 2.5 | x | x | 19 |
| 6 | B-4 | 0.2 | — | 0 | 140 | 2.4 | x | o | 89 |

*1B-1 ... Glycerine monostearate
B-2 ... Diglycerine monostearate
B-3 ... Glycerine monobehenate
B-4 ... Pentaerythritol monostearate
*2C-1 ... Stearyl alcohol
C-2 ... Behenyl alcohol
C-3 ... Myristyl alcohol
C-4 ... Cetyl alcohol
*3Yellowing factor ... Measured according to JIS K 7103.
*4Appearance of Inside of Mold ... Examined with the naked eye after 120 shots.
o: Good
x: Attachment of sticky material
*5Surface of Molding ... Examined with the naked eye.
o: Good
x: Development of cracks
*6Izod Impact Strength (notched) .. Measured according to JIS K 7110.

We claim:

1. A polycarbonate resin composition which comprises
    (A) a polycarbonate resin derived from a divalent phenol and a carbonate precursor and containing from 10 to 6,000 parts per million of phenolic residues,
    (B) a partial ester of an aliphatic saturated monovalent carboxylic acid and a polyhydric alcohol in amount of from 0.001 to 0.5 part by weight per 100 parts by weight of the component (A) and
    (C) a mixture of one or more of an aliphatic higher monohydric alcohol in amount of from 0.003 to 1.0 part by weight per 100 parts by weight of the component (A).

2. The composition as claimed in claim 1, wherein the polycarbonate resin is a polycarbonate resin having a viscosity average molecular weight of from 10,000 to 100,000.

3. The composition as claimed in claim 1, wherein the aliphatic saturated monovalent carboxylic acid of the component (B) is an aliphatic saturated monovalent carboxylic acid having carbon atoms of from 10 to 24.

4. The composition as claimed in claim 3, wherein the aliphatic saturated monovalent carboxylic acid is a compound selected from the group consisting of capric acid, lauric acid, myristic acid, palmitic acid, stearic acid, arachidic acid and behenic acid.

5. The composition as claimed in claim 1, wherein the polyhydric alcohol of the component (B) is a compound selected from the group consisting of ethylene glycol, propylene glycol, ethylethylene glycol, trimethylene glycol, tetramethylene glycol, propanetriol, methylpropanetriol, butanetriol, pentanetriol, hexanetriol, erythritol, pentaerythritol, diglycerine, sorbitan, adonitol, arabitol, allitol, talitol, sorbitol and mannitol.

6. The composition as claimed in claim 1, wherein the component (B) is a compound selected from the group consisting of glycerine monostearate, diglycerine monostearate, glycerine monopalmitate, glycerine monobehenate, sorbitan monostearate and pentaerythritol monostearate.

7. The composition as claimed in claim 1, wherein the aliphatic higher monohydric alcohols of the component (C) is an aliphatic higher monohydric alcohols having carbon atoms of from 12 to 30.

8. The composition as claimed in claim 7, wherein the aliphatic higher monohydric alcohol is a compound selected from the group consisting of myristyl alcohol, cetyl alcohol, stearyl alcohol, arachidic alcohol and behenyl alcohol.

9. The composition as claimed in claim 1 wherein said divalent phenol is selected from the group consisting of 2,2-bis(4-hydroxyphenyl)propane, hydroquinone, 4,4'-dihydroxydiphenyl, bis(4-hydroxyphenyl) alkane, bis(4-hydroxyphenyl) cycloalkane, bis(4-hydroxyphenyl) sulfide, bis(4-hydroxyphenyl)sulfone, bis(4-hydroxyphenyl)sulfoxide, bis(4-hydroxyphenyl)ether, (3,5-dibromo-4-hydroxyphenyl) propane, bis(3,5-dichloro-4-hydroxyphenyl)propane, homopolymers thereof and copolymers of two or more thereof.

10. The composition of claim 9 wherein said carbonate precursor is phosgene or diphenyl carbonate.

11. The composition of claim 10 wherein the divalent phenol is 2,2-bis(4-hydroxyphenyl) propane, the partial ester is glycerin monostearate, diglycerine monostearate, glycerine monobehenate or pentaerythritol monostearate; and the higher monohydric alcohol is stearyl alcohol, behenyl alcohol or a mixture thereof.

12. The composition as claimed in claim 11 wherein the aliphatic saturated monovalent carboxylic acid has 10 to 24 carbon atoms and the polyhydric alcohol is ethylene glycol, propylene glycol, ethylethylene glycol, trimethylene glycol, tetramethylene glycol, propanetriol, methylpropanetriol, butanetriol, pentanetriol, hexanetriol, erythritol, pentaerythritol, diglycerine, sorbitan, adonitol, arabitol, allitol, talitol, sorbitol or mannitol.

13. The composition as claimed in claim 1 wherein the aliphatic higher monohydric alcohols have 12 to 30 carbon atoms.

14. The composition as claimed in claim 1 wherein the aliphatic higher monohydric alcohol is myristyl alcohol, cetyl alcohol, stearyl alcohol, arachidic alcohol or behenyl alcohol.

15. The composition as claimed in claim 1 wherein the aliphatic saturated monovalent carboxylic acid has 10 to 24 carbon atoms and the polyhydric alcohol is ethylene glycol, propylene glycol, ethylethylene glycol, trimethylene glycol, tetramethylene glycol, propanetriol, methylpropanetriol, butanetriol, pentanetriol, hexanetriol, erythritol, pentaerythritol, diglycerine, sorbitan, adonitol, arabitol, allitol, talitol, sorbitol or mannitol.

* * * * *